United States Patent

[11] 3,601,773

| [72] | Inventors | Edward Frieling<br>Livingston, N.J.;<br>William G. Konos, Salem, Mass. |
|---|---|---|
| [21] | Appl. No. | 833,257 |
| [22] | Filed | June 16, 1969 |
| [45] | Patented | Aug. 24, 1971 |
| [73] | Assignee | Hartman Marine Incorporated<br>Newark, N.J. |

[54] WIRELESS R. F. RADIATION TACHOMETER
16 Claims, 4 Drawing Figs.

[52] U.S. Cl. .................................................. 324/170,
343/70
[51] Int. Cl. ...................................................... G01p 3/48
[50] Field of Search ............................................ 324/70, 78,
15–18; 343/70

[56] References Cited
UNITED STATES PATENTS

| 3,098,973 | 7/1963 | Wickersham .................. | 343/701 |
| 3,175,152 | 3/1965 | Shafer .......................... | 324/70 |

FOREIGN PATENTS

| 958,060 | 5/1964 | Great Britain .................. | 324/169 |

OTHER REFERENCES

R. M. Benrey; Build Your Own " Wireless" Tach; Popular Science; March, 1965; pp. 110– 112.

*Primary Examiner*—Michael J. Lynch
*Attorneys*—Louis Altman and Mattern, Ware & Davis ABSTRACT: A tachometer which does not require any wired connections or inductive probes. It picks up radiation from ignition spark discharges and the like, and uses these to trigger a tunnel diode which activates a pulse-stretching monostable multivibrator. An ammeter is in series with the output current of the multivibrator, and is calibrated in r.p.m. The nonretriggerable period enhances the accuracy of the tachometer by providing noise blanking. A switching circuit adjusts the electrical value of a coupling network between stages of the multivibrator and adjusts the period thereof to accommodate two, three, four or six cylinder internal combustion engines without sacrificing any of the noise blanking capability. The coupling network incorporates a plurality of matched timing capacitors, enabling the tachometer to be calibrated for any number of engine cylinders by means of a single potentiometer.

PATENTED AUG 24 1971 3,601,773
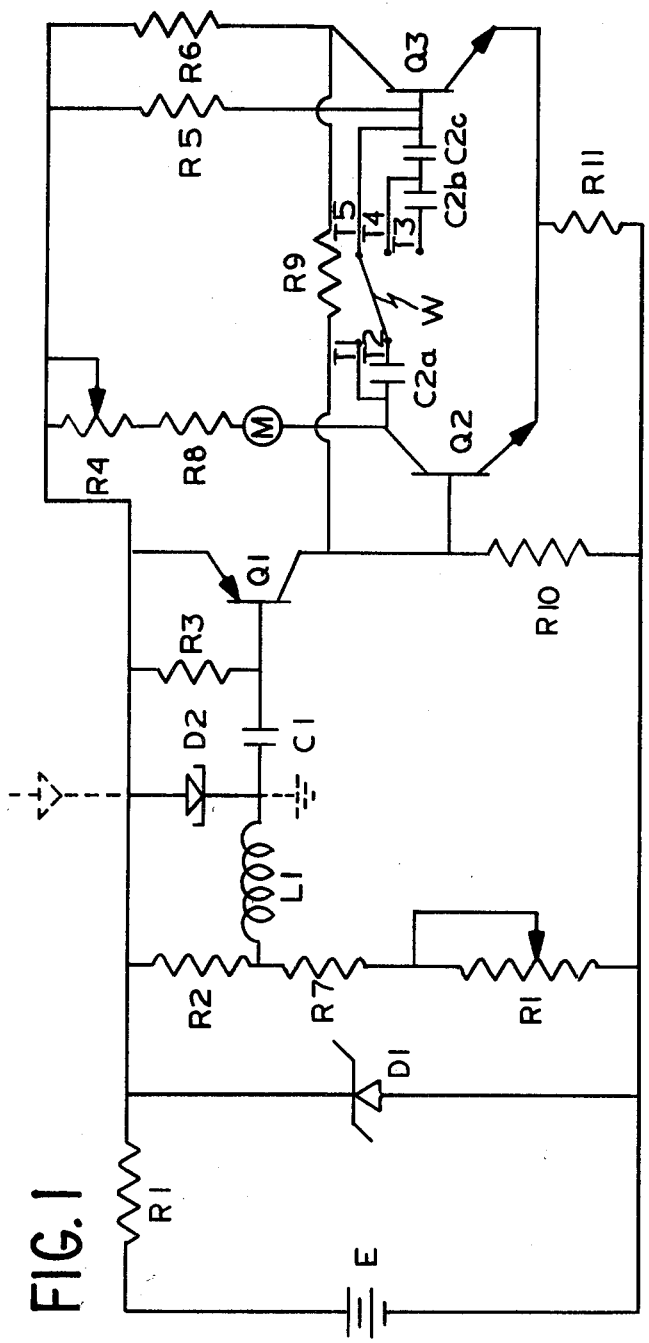
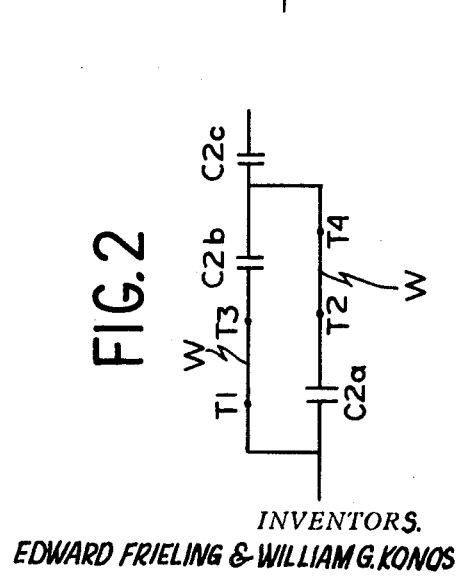
INVENTORS.
EDWARD FRIELING & WILLIAM G. KONOS
BY Louis Altman
Att'y

WIRELESS R. F. RADIATION TACHOMETER

FIELD OF THE INVENTION

This invention relates generally to tachometers, and is particularly concerned with a wireless portable device for use aboard small pleasure boats and other vehicles.

THE PRIOR ART

Until now, the tachometers available for use in small motor boats, automobiles and similar motor-driven vehicles have presented the purchaser with an unfortunate choice between various types of devices which are all either inaccurate, expensive, or require burdensome installation.

For example, one type of tachometer operates by photoelectric detection of a light which blinks at a rate proportional to engine speed. Another type has a generator which rotates with the engine shaft and produces a voltage proportional to engine speed. Both these types must be designed as an integral part of the motor, since they cannot be installed subsequently except perhaps by modifying the original structure, which is difficult and expensive.

There is one type of prior art tachometer which requires no connection to the engine, i.e. the type which employs resonant reeds to detect engine vibrations. However this type of unit is expensive, and must be mounted on the bulkhead of the boat.

Until now, the nearest thing to a small, hand-holdable portable tachometer for occasional use in small motorboats and other vehicles has been the type of device having a wire probe which is either physically connected or inductively coupled to the ignition system of an internal combustion engine. These units have the advantage of being inexpensive, but they are also inaccurate, and they still require some sort of connection to the engine. Even with the inductive type of device, the probe must come within inches of an ignition wire, and the tachometer must be connected before use and later disconnected if it is to be removed from the boat after use. It therefore is not a "wireless" device in the full sense of that word.

THE INVENTION

This invention provides a tachometer which is ideally suited for occasional use in small motor boats and other vehicles. It is a small, hand-holdable, completely portable device which requires no wires or other connections to the engine, nor any other sort of installation. Yet it is extremely accurate, being competitive in that respect with units costing around 10 times as much. Thus a unit of this type may be brought on board a boat when the occasion demands, and immediately put into use without the necessity for any installation or any connection to the motor. Afterwards it may simply be carried off the boat without the need for disconnecting or disengaging it. While on board, it gives accurate readings, and operates at a very low current drain so as to achieve many hours of life on a single 9 volt transistor energizer battery.

Most significantly, the present tachometer operates at substantial distances from the motor. Not only is there no connecting wire or inductive probe contacting or approaching the motor, but the tachometer will develop a reading from anywhere on board the boat and even from many feet away from the boat, owing to the fact that it senses the electromagnetic energy radiated by the ignition spark discharges of an internal combustion engine. Moreover, the device will also sense the radiation given off by the spark discharges of electric motor brushes. It will be readily appreciated that radiant energy can easily be detected by a sensitive instrument at distances of hundreds of feet or more, whereas an inductive probe must be within inches of the current-carrying member to which it is coupled.

The present tachometer circuit thus includes an electromagnetic radiation burst detector capable of sensing a motor spark discharge at a substantial distance. The circuit provides an output which is substantially proportional to the number of bursts of radiation detected per unit time, and a visual indicator responsive to that output is calibrated in motor revolutions per unit time.

BRIEF DESCRIPTION OF THE DRAWINGS

FIG. 1 is a schematic circuit diagram of a preferred embodiment of a tachometer in accordance with this invention, wired for use with a two cylinder, two cycle internal combustion engine.

FIGS. 2 through 4 are partial schematic circuit diagrams illustrating alternative connections which are used for accommodating the tachometer circuit of FIG. 1 to internal combustion engines having three, four and six cylinders respectively.

The same reference characters refer to the same elements throughout the several views of the drawing.

DETAILED DESCRIPTION OF THE PREFERRED EMBODIMENT

In order to make the tachometer device of this invention small and portable, it employs low current drain solid-state components and the circuit is powered exclusively by a single battery E which is preferably an ordinary 9-volt transistor energizer. The battery voltage is applied through a current limiting resistor R1 to a voltage regulating Zener diode D1 and a voltage divider network comprising resistor R2 and R7 and a potentiometer R1 all connected in series across the battery E. The radiation burst associated with each spark discharge of an internal combustion engine (or each brush arcing of an electric motor) is detected by a tunnel diode D2 which is connected in series with a choke L1 across resistor R2. The potentiometer R1 is adjusted so that tunnel diode D2 is biased to a point on the high current, low voltage portion of its characteristic curve just before the negative resistance slope. As a result, tunnel diode D2 is very near its switching threshold.

A virtual antenna is shown connected to the anode and a virtual ground connected to the cathode of tunnel diode D2, illustrating that radiation bursts are conducted through the tunnel diode. In fact, however, in the preferred embodiment of the tachometer circuit illustrated in FIG. 1, it is not necessary to connect any actual external antenna or ground. Not even a wire loop antenna within the casing of the tachometer is required. The sensitivity of the tunnel diode radiation detector D2 is such that the leads connected thereto (as shown in solid lines in the circuit of FIG. 1) represent all the antenna and ground connections required for radiation detection.

As a radiation burst is picked up by the virtual antenna and applied across tunnel diode D2 to the virtual ground, it momentarily boosts the tunnel diode operating point over the switching threshold, causing it to slip rapidly down the negative resistance slope and into the low current, high voltage area of the diode characteristic. As the diode voltage rises during this switching event, the diode current tends to decrease. In order to stretch out the decrease in tunnel diode current over a longer time interval and thus extend the duration of the diode switching event, choke L1 provides a more constant current for the tunnel diode D2, and prevents it from switching almost instantaneously as would otherwise be the case. The result is a somewhat longer output pulse from the tunnel diode D2, which is more useful in driving the following stage Q1.

As the tunnel diode switches, the momentarily increased forward voltage across the diode is applied across the emitter and base of the PNP amplifying stage Q1. The anode of tunnel diode D2 is directly connected to the Q1 emitter, and its cathode is coupled to the Q1 base through a capacitor C1. A resistor R3 is connected in series with the coupling capacitor T1 and tunnel diode D2 to provide a discharge path for the capacitor. The momentary increase in tunnel diode forward voltage drives the emitter of Q1 high relative to its base, causing Q1 to turn on and amplify the tunnel diode switching pulse. The amplified output pulse is developed by the collector current of Q1 across a load resistor R10.

Tunnel diode switching is a process which takes place very rapidly; and even with the amount of pulse-stretching provided by choke L1, the output pulse developed across resistor R10 is still relatively brief. For this reason there is provided a monostable multivibrator pulse stretcher comprising a pair of NPN stages Q2 and Q3 which serve to stretch the output pulse to a substantially longer duration. Stage Q3 of the multivibrator is normally on, although it draws a very small standby current through its collector resistor R6 and emitter resistor R11, in order to reduce current drain and extend the life of battery E. The base drive required to keep stage Q3 on is provided by the current which flows through resistor R5.

When a burst of radiation is detected by the tunnel diode D2, the amplified output pulse of transistor Q3 developed across resistor R10 drives the base of stage Q2 positive, causing Q2 to turn on. Q2 then draws collector current through a potentiometer R4, a limiting resistor R8 and an ammeter M. The ammeter reading is proportional to the average collector current of transistor Q2, which in turn is proportional to the repetition rate of the monostable multivibrator Q2, Q3. That in turn is proportional to the number of radiation bursts per unit time detected by the tunnel diode D2, reflecting the number of arc discharges per unit time generated by an internal combustion engine ignition system or by a set of electric motor brushes. For a motor having a given number of spark discharges per shaft revolution, the meter reading is therefore proportional to the number of motor shaft revolutions per minute, and the meter can be calibrated in r.p.m. However, some provision must be made for adjusting the constant of proportionality between the meter reading and the spark discharge repetition rate if the tachometer circuit of FIG. 1 is to be usable for two cycle and four cycle internal combustion engines, or for engines having different numbers of cylinders, and electric motors having different numbers of brushes.

The function of Q3 is to latch Q2 in the conducting condition during the period of the monostable multivibrator circuit. Q3 is normally on, but turns off in response to the switching on of Q2, and the off condition of Q3 serves to sustain the on condition of Q2. The coupling which causes stage Q2 to cut off stage Q3 is provided by one or more of the capacitors C2 which are connected in some appropriate configuration from the collector of Q2 to the base of Q3. Capacitors C2 are normally charged, so that under standby conditions no current flows through the capacitors. As a result, transistor Q3 normally stays on because capacitors C2 provide no alternative path for the Q3 base drive current which arrives over resistor R5.

However, when a radiation burst sensing event turns transistor Q2 on, capacitors C2 rapidly discharge through the low impedance path provided by Q2 and the emitter resistor R11 which it shares with Q3. Once discharged, the coupling capacitors C2 then draw recharging current through resistor R5, diverting sufficient current from the base of Q3 to deprive it of the base drive needed to remain on. Q3 therefore turns off, and once it does so, the current which formerly flowed through Q3 from resistor R6 is now diverted through resistors R9 and R10. As a result, a voltage is developed across R10 sufficient to keep transistor Q2 on for the duration of the cutoff interval of transistor Q3. Thus Q2 remains on even after the termination of the radiation signal and after the termination of the tunnel diode switching event which originally turned it on, in order to stretch the duration of the circuit response to each radiation burst.

The period of the monostable multivibrator Q2, Q3 (i.e. the length of time during which Q2 is on and Q3 is off) is determined by the time required for the coupling capacitors C2 to recharge through R5, Q2 and R11. Thus the coupling capacitors C2 are in reality timing elements which help determine the multivibrator period. Once the capacitors C2 have been recharged, they no longer provide a conducting path, and current through resistor R5 is once again diverted to the base of transistor Q3, resupplying it with base drive for turning Q3 on. When Q3 is thus turned on, the current through resistor R6 takes the low impedance path through Q3 and R11, and thus is no longer diverted through resistors R9 and R10 to supply a base signal to Q2. Consequently Q2 turns off, and the initial conditions are restored to await the next radiation burst detection event.

By changing the value of the capacitive coupling C2, the period of the monostable multivibrator Q2, Q3 can be altered to accommodate the tachometer of this invention to internal combustion engines having different numbers of cycles and cylinders, or to electric motors having different numbers of brushes. Suppose the meter M is calibrated for a two cylinder, two cycle internal combustion engine, which generates one spark discharge per engine revolution, and hence a number of spark discharges per minute equal to the engine speed in r.p.m. Then if the tachometer is used without change to measure the speed of r.p.m., four cylinder, two cycle internal combustion engine having two spark discharges per engine revolution and therefore twice as many spark discharges per minute as the engine speed in r.p.m. the tachometer will give an erroneous reading of twice the speed.

This is overcome in the present circuit by shortening the period of the multivibrator Q2, Q3 so that when the tachometer is used with an engine having more cylinders the duration of each output current pulse which passes through the meter M is shorter. Then the circuit compensates for the greater number of spark discharges per engine revolution by producing a larger number of smaller duration output current pulses, which integrate up to the same average meter current for a given number of motor revolutions per unit time. As a result, the average meter current, and the meter reading in r.p.m. will be the same for a given motor speed regardless of the number of cylinders or the number of brushes.

The monostable multivibrator period is shortened as required by decreasing the value of the total capacitance C2 connected from the collector of Q2 to the base of Q3. With a smaller timing capacitance C2 in the circuit, a shorter time is required for that capacitance to recharge through resistors R5, R10 and transistor Q2. As a result, the latching stage Q3 of the monostable multivibrator turns back on more quickly, to cut off stage Q2 and cut short the monostable multivibrator period.

In a typical embodiment of a tachometer as seen in FIG. 1, the timing capacitor C2 comprises three individual components C2a, C2b and C2c which are connected as shown to transistors Q2 and Q3 respectively, and to plug terminals T1 through T5. Terminals T1 and T2 are associated with the collector of transistor Q2, while terminals T3, T4 and T5 are associated with the base of transistor Q3. Terminals T1 and T5 are connected directly to their respective transistor electrodes, terminals T2 and T4 are connected through one capacitor C2a and C2c respectively, and terminal T3 is connected through two capacitors C2b and C2c in series. The selection of an appropriate multivibrator period for use with a particular motor is made by connecting at least one of the terminals in the Q2 group (i.e. terminals T1 and T2) to at least one of the terminals in the Q3 group (i.e. terminals T3 through T5). In a preferred physical realization of the circuit of FIG. 1, terminals T1 through T5 are on a plug board which is accessible externally of the tachometer casing, and connecting wires W with appropriate plug terminals at both ends are provided for connecting the appropriate pair or pairs of terminals. For example, as seen in FIG. 1, terminal T2 can be connected by a single wire W to terminal T5 so that a single timing capacitor T2a is connected from the collector of transistor Q2 to the base of transistor Q3 when the tachometer is being used to measure the speed of a two cylinder, two cycle internal combustion engine.

The capacitors C2a through C2c are all matched so as to be equal to within about 1 percent. Accuracy in itself is not particularly important, so that economies may be achieved by the choice of relatively inexpensive components, but some care is taken to sort them into matched groups of three for use in the same tachometer. As a result of this substantial equality between the capacitors, the tachometer can be accommodated to different numbers of engine cylinders or motor brushes by changing the period of the monostable multivibrator Q2, Q3 in integral steps through the expedient of adding or subtracting one capacitor at a time. For example, as shown in FIG. 3 if the wire W is connected between terminals T1 and T3 as illustrated in FIG. 3, then it is apparent that two of the timing capacitors C2b and C2c will be connected in series between the Q2 collector and Q3 base, in effect halving the timing capacitance and halving the multivibrator period, compared to the arrangement seen in FIG. 1. As a result, if the connection shown in FIG. 1 is calibrated (by means of the potentiometer R4) for a two cylinder, two cycle internal combustion engine, then the arrangement of FIG. 3 will be appropriate for a four cylinder, two cycle engine.

Similarly, the arrangement of FIG. 4, in which the wire W is connected between terminals T2 and T3, will place all the timing capacitors C2a, C2b and C2c in series, thus cutting the total capacitance and the resulting multivibrator period to one-third of those achieved with the circuit of FIG. 1. Accordingly, the arrangement of FIG. 4 is appropriate for a six cylinder, two cycle internal combustion engine.

If the tachometer is to be used with a three cylinder, two cycle internal combustion engine, then two connecting wires W are used to connect terminal T1 to terminal T3 and terminal T2 to terminal T4 as shown in FIG. 2. As a result, stages Q2 and Q3 are coupled by one of the capacitors C2c in series with the parallel combination of capacitors C2a and C2b. When three substantially equal capacitors are connected in the series-parallel combination of FIG. 2, the total capacitance is two-thirds of the capacitance of any one of the matched capacitors C2. As a result, the monostable multivibrator period is two-thirds times the duration it would have with only one capacitor. It follows that the arrangement of FIG. 2 is appropriate for a three cylinder, two cycle engine, assuming the circuit has been calibrated for a two cylinder, two cycle engine when the capacitors C2 are connected as in FIG. 1.

The advantage of using matched capacitors C2a through C2c in the present circuit is that the capacitance can be changed in steps of C, 2C/3, C/2 and C/3 in order to change the adjustment of the tachometer from two to three, four or six engine cylinders. Moreover, this can be done on the basis of a single meter calibration, performed (with the potentiometer R4) while the capacitive coupling C2 is arranged for any number of cylinders. If the value of capacitance C2 were adjusted by connecting and disconnecting capacitors of different values, it would not be possible to obtain the same tolerance at each different capacitance level. Then, in addition to the capacitance change, a different resistance would have to be in series with the meter M, for example a different value of the calibration potentiometer R4, for each different number of cylinders, in order to compensate for the difference in capacitor tolerances. In the present circuit, because the matched capacitors used all have the same tolerance, any circuit combination of these capacitors also has that same tolerance. Therefore the meter calibration potentiometer R4 can always be left at the same setting.

There are a number of important advantages which accrue from the use of changes in the period of the multivibrator Q2, Q3 to alter the adjustment for the number of engine cylinders. One could take some other approach, such as adjusting the amount of resistance in series with the meter M in order to achieve different meter scale factors for adjusting the tachometer to a different number of engine cylinders. One advantage of the capacitive over the resistive approach is that capacitors, even matched capacitors, are less expensive than the potentiometers which would otherwise have to be used in series with the meter M. Thus greater component economies are achieved by adopting the capacity approach.

Moreover, if the monostable multivibrator period remained constant as the tachometer was adapted to different numbers of engine cylinders by varying the meter scale factor, the circuit would produce its best results only for one particular number of engine cylinders. The monostable multivibrator circuit Q2, Q3 is nonretriggerable during a cycle. Consequently it renders the tachometer circuit of FIG. 1 immune to any noise radiation which is detected by the tunnel diode D2 during the multivibrator period. Thus if the multivibrator period lasts from one radiation signal burst to the next, maximum noise rejection and maximum accuracy of operation are achieved. This is important, because the ignition points of an internal combustion engine tend to produce secondary arcing, particularly at high engine speeds, and there are also various other generators of radio frequency interference on the particular internal combustion engine or electric motor being measured, as well as on other devices which might be in the area. If the monostable multivibrator cycle ends prematurely, the circuit may respond to noise radiation occuring in the interval between signal bursts, and thus give an engine speed reading which is too high. Moreover, such errors can not easily be compensated for, since not as much noise radiation is generated by an internal combustion engine at high speeds as at low speeds.

Thus, if the period of the monostable multivibrator Q2, Q3 were a fixed interval and the circuit had to be adapted to different numbers of engine cylinders by changing the meter scale factor, the minimum multivibrator period would have to be used in order for the circuit to function properly with a six cylinder engine. This would then make the circuit sensitive to noise for engines with smaller numbers of cylinders.

The principal advantage of the present circuit, however, is that it is the only one which is completely independent of wired connections or inductive couplings to the ignition system, requires no installation relative to the engine or vehicle, is small, portable and hand-holdable, has low current drain and long battery life, and achieves the accuracy of much more costly instruments, yet is competitive in cost with the least expensive units.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. In a remotely responsive tachometer for measuring the angular speed of a motor having spark-generating means which radiates bursts of permanently escaping electromagnetic energy at radio frequencies over substantial distances in correspondence with its spark discharges, in addition to the magnetic induction field which surrounds the spark currents and which ultimately collapses and returns its energy to said spark-generating means when such currents terminate; said tachometer being of the type including a support having mounted thereon an indicator-driving circuit responsive to electrical pulses representative of spark discharges for generating an electrical indicator-driving signal having a magnitude substantially proportional to the repetition rate of said spark discharges, and visual indicating means responsive to said indicator-driving signal for providing an indication of the angular speed of the motor; the improvement comprising:

an R.F. detection circuit including a threshold R.F. detector and means biasing said detector near enough to its threshold so that said detector exceeds said threshold at least primarily in response to said permanently escaping bursts of electromagnetic energy radiated by said spark discharges, independently of the magnetic induction field of the spark current;

said detection circuit being mounted on said support and arranged so that the exceeding of said threshold by said detector causes said detection circuit to produce said spark-discharge-representing electrical pulses in correspondence with said bursts of radiated electromagnetic energy detected thereby;

and said indicator-driving circuit being connected to respond to said electrical pulses produced by said detection circuit.

2. A tachometer as in claim 1 wherein said threshold detector includes a tunnel diode, and said biasing means biases said tunnel diode just below its switching threshold, and said detection circuit is connected for picking up said radiated energy and applying it to drive said tunnel diode beyond said switching threshold;

and wherein said detection circuit is responsive to switching of said tunnel diode and arranged so that the output of said detection circuit has a magnitude which is substantially proportional to the repetition rate of said tunnel diode switching events.

3. A tachometer as in claim 1 wherein said indicator-driving circuit comprises:

a monostable multivibrator having a predetermined period exceeding the duration of said spark-discharge-representing pulse;

means causing said multivibrator to trigger in response to a spark-discharge-representing pulse whereby to generate a multivibrator pulse longer than said spark discharge representing pulse for pulse-stretching purposes;

said indicator-driving circuit being responsive to said multivibrator to produce output pulses, the duration and repetition rate of which are controlled respectively by the period and repetition rate of said multivibrator, whereby the output current of said indicator-driving circuit is substantially proportional to said multivibrator repetition rate.

4. A tachometer as in claim 3 wherein said multivibrator comprises:

a first stage responsive to said spark-discharge-representing pulse;

a second stage for latching said first stage during the period of said multivibrator;

and impedance means connected between said multivibrator stages for causing said second stage to latch said first stage during said multivibrator period, and allowing said second stage to release said first stage at the conclusion of said multivibrator period, and arranged so that value of said impedance means determines the period of said multivibrator.

5. A tachometer as in claim 4 further comprising:

means for adjusting the electrical value of said impedance means whereby to adjust the period of said multivibrator in order to adjust the duration of said indicator-driving circuit output pulses to compensate for a change in the repetition rate of said pulses due to a different number of spark discharges per motor revolution.

6. A tachometer as in claim 5 wherein:

said adjusting means is arranged to adjust the electrical value of said impedance means in discrete steps corresponding to different, integrally related numbers of spark discharges per motor revolution.

7. A tachometer as in claim 6 wherein:

said impedance means comprises a plurality of substantially equal-valued timing components, one of which is connected between said multivibrator stages, and adjusts said tachometer for a selected minimum number of spark discharges per motor revolution;

and said adjusting means comprises means for switching additional ones of said equal-valued timing components into and out of connected relationship between said multivibrator stages one at a time.

8. A tachometer as in claim 7 wherein:

said timing components are capacitors;

means are arranged so that the connected ones of said capacitors are normally charged;

means connect said second multivibrator stage to be on only when said connected capacitors are charged, and to turn off said first multivibrator stage when said second stage is on;

means are connected so that, upon turning on in response to a spark-discharge-representing pulse, said first stage discharges said connected capacitors to turn off said second stage;

means are connected to latch said first stage on when said second stage is off;

means cooperate with said capacitors after said discharge to recharge said capacitors over an interval exceeding the duration of said spark-discharge-representing pulse;

and means are connected to turn said second stage back on whereby to turn off said first stage at the end of said recharging interval.

9. A tachometer as in claim 8 wherein said adjusting means comprises:

means for switching one or more of said capacitors in series with each other.

10. A tachometer as in claim 9 wherein said adjusting means further comprises:

means for switching at least two of said capacitors in parallel.

11. A tachometer as in claim 10 wherein:

said impedance means comprises a first group of at least one of said capacitors in series between a first set of at least two terminals, and a second group of at least two of said capacitors alternately interspersed in series with a second set of at least two terminals;

and said adjusting means comprises connecting means for selectively connecting at least one of said terminals of said first set to respective terminals of said second set.

12. A tachometer as in claim 11 wherein:

said connecting means is operable to put at least two of said capacitors in parallel and said parallel capacitors simultaneously in series with at least one other of said capacitors 13. A tachometer as in claim 5 further comprising:

a single adjustable component connected to said visual indicating means to calibrate said tachometer at any adjustment.

14. A tachometer as in claim 13 wherein:

said single adjustable component is an adjustable resistance in series with said visual indicating means.

15. A tachometer of the type described in claim 1 wherein said threshold R.F. detector includes an abruptly variable impedance element; and wherein the impedance of said element varies abruptly in response to the detection of said radiated energy.

16. A tachometer of the type described in claim 1 wherein at least virtual R.F. antenna means for picking up said radiated energy is coupled to said threshold detector and is mounted on said tachometer support.